United States Patent [19]

Clishem et al.

[11] Patent Number: 4,542,488
[45] Date of Patent: Sep. 17, 1985

[54] METHOD AND SYSTEM FOR PRODUCING A PPI DISPLAY

[75] Inventors: James A. Clishem, Carrollton; Charles L. Dennis; Joseph Zemanek, Jr., both of Dallas, all of Tex.

[73] Assignee: Mobil Oil Corporation, New York, N.Y.

[21] Appl. No.: 400,842

[22] Filed: Jul. 22, 1982

[51] Int. Cl.$^4$ .............................................. G01V 1/40
[52] U.S. Cl. ................................. 367/35; 346/33 WL; 367/69
[58] Field of Search ................ 181/102, 105; 315/378; 367/25, 35, 68, 69, 71, 86; 340/727, 743; 343/5 EM; 346/33 WL, 33 C

[56] References Cited

U.S. PATENT DOCUMENTS

| | | | |
|---|---|---|---|
| 3,369,626 | 2/1968 | Zemanek, Jr. | 346/33 WL |
| 3,668,619 | 6/1972 | Dennis | 367/71 |
| 3,718,204 | 2/1973 | Groenendyke | 367/71 |
| 4,428,053 | 1/1984 | Tol | 364/457 |

Primary Examiner—Salvatore Cangialosi
Assistant Examiner—K. R. Kaiser
Attorney, Agent, or Firm—A. J. McKillop; Michael G. Gilman; George W. Hager, Jr.

[57] ABSTRACT

A borehole logging tool employs an energy transmitter and receiver for scanning a borehole with energy pulses. An orientation pulse is produced each time the tool rotates past a predetermined orientation position. The time period between orientation pulses is measured and divided into a plurality of discrete intervals. Sine and cosine functions are generated for the measured time period having a sine and cosine value corresponding to each of the discrete intervals. The sine and cosine functions are used to produce sweep functions for controlling the outward sweep of the electron beam of a PPI display device so as to produce a circular rotating pattern in which each revolution corresponds in time to a measured time between orientation pulses. The output of the receiver modulates the electron beam sweep to generate a visual display of the azimuthal scan of the borehole.

10 Claims, 5 Drawing Figures

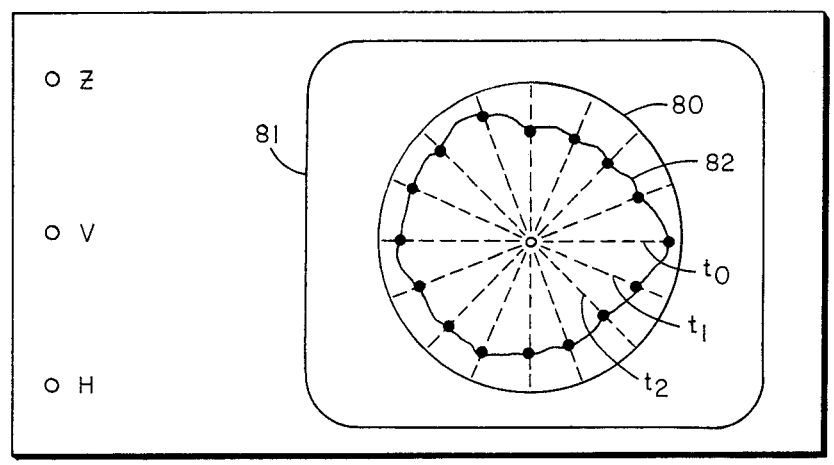
FIG. 2
FIG. 3
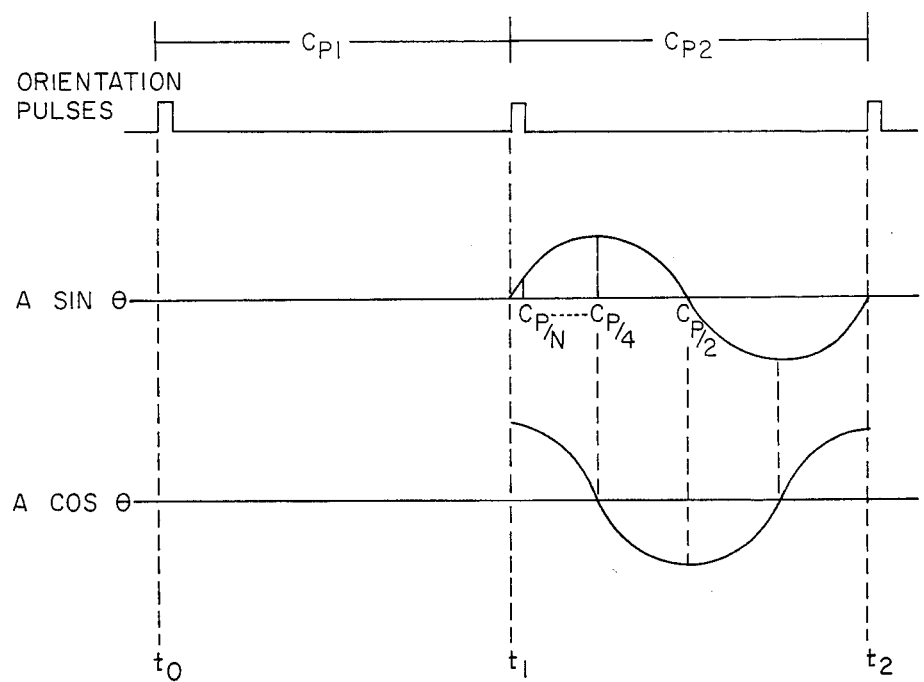

METHOD AND SYSTEM FOR PRODUCING A PPI DISPLAY

BACKGROUND OF THE INVENTION

This invention relates generally to a method and system for producing a PPI display and more particularly to a technique and recording system for recording, on a two-dimensional PPI display device data obtained from borehole scanning operations.

It is frequently necessary to measure the diameter, or cross sectional area, of a borehole which may extend to great depth. In addition to determining the actual configuration of the borehole, it may be desirable to determine anomalies which may exist at different depths in the borehole. For example, the anomalies may be a fault or crack in the borehole, or in a well casing. Perforations of the well casing may need to be inspected. In other situations, it may be desirable to determine the existence of faults, or other characteristics, in the adjacent formations spaced from the borehole.

A borehole logging system useful for making such determinations is described in U.S. Pat. No. 3,668,619 to Dennis. In such system, a borehole logging tool includes an acoustic transmitting means that is rotated and periodically operated to transmit acoustic energy pulses toward the borehole wall. The transducing means detects reflected energy for the production of reflection signals. During logging operations, an orientation signal is produced each time the borehole logging tool is rotated past a predetermined geographic orientation, such as magnetic north. These orientation signals are employed to produce two sine and cosine functions. The orientation pulses trigger a function generator which produces the sine function. The cosine function is then produced from the sine function.

The acoustic reflection signals and the sine and cosine functions are applied to a PPI recording system comprising a display device, two electron beam deflection means, and an electron beam intensity modulating means. The two orientation functions sine and cosine are applied to the electron beam deflection plates on the PPI display so as to cyclically reproduce a circular rotating beam sweep. The reflection signals are applied to the video input of the PPI display to intensify the electron beam for the display of a trace pattern reflecting information representative of variations in the distance between the transducing means and the wall of the borehole or other subsurface anomalies within or surrounding the borehole. A somewhat similar system is described in U.S. Pat. No. 3,369,626 to Zemanek.

SUMMARY OF THE INVENTION

In accordance with the present invention there is provided a method and system for producing a reference circle for a PPI display device from orientation pulses representing the movement of a rotational device past a fixed orientation position. In carrying out this invention, the time period between successive orientation pulses is divided into a plurality of discrete intervals. First and second sweep functions are produced corresponding to such sine and cosine functions respectively and are applied to the electron beam deflection means of the PPI display device to generate a uniform reference circle with the electron beam on the face of the PPI display device regardless of time variability in the occurrance of the orientation pulses.

In a more specific aspect, a borehole logging system employs a PPI display for producing an azimuthal display of scanning operations within a borehole. An energy transmitter and receiver assembly is moved through a borehole and rotated about the borehole axis. An orientation pulse is generated each time the assembly passes a predetermined geographical orientation. The time period between the orientation pulses is measured and divided into a plurality of discrete intervals. Sine and cosine functions are generated for the measured time period having sine and cosine values for each of the plurality of discrete intervals. First and second sweep functions are produced having a plurality of sweep cycles corresponding to the plurality of discrete sine and cosine values respectively. One of the sweep functions is applied to the horizontal deflection means for the PPI display and the other of the sweep functions is applied to the vertical deflection means for the PPI display to produce a circular rotating pattern in which each revolution corresponds in time to the measured time period between orientation pulses. The output of the transmitter and receiver assembly is applied to the electron beam modulation input of the PPI display to thereby generate a visual display of the azimuthal scan of the borehole.

BRIEF DESCRIPTION OF THE DRAWINGS

FIG. 2 illustrates a PPI display produced in accordance with the present invention.

FIG. 3 illustrates a timing diagram associated with the production of electron beam deflection signals for the PPI display.

DESCRIPTION OF THE PREFERRED EMBODIMENT

The present invention is directed to a new and improved method and system for producing a PPI display and, more particularly to a method and system for utilizing borehole logging tool orientation pulses in the generation of sine and cosine functions for use in the PPI display of borehole information.

Figure 1:
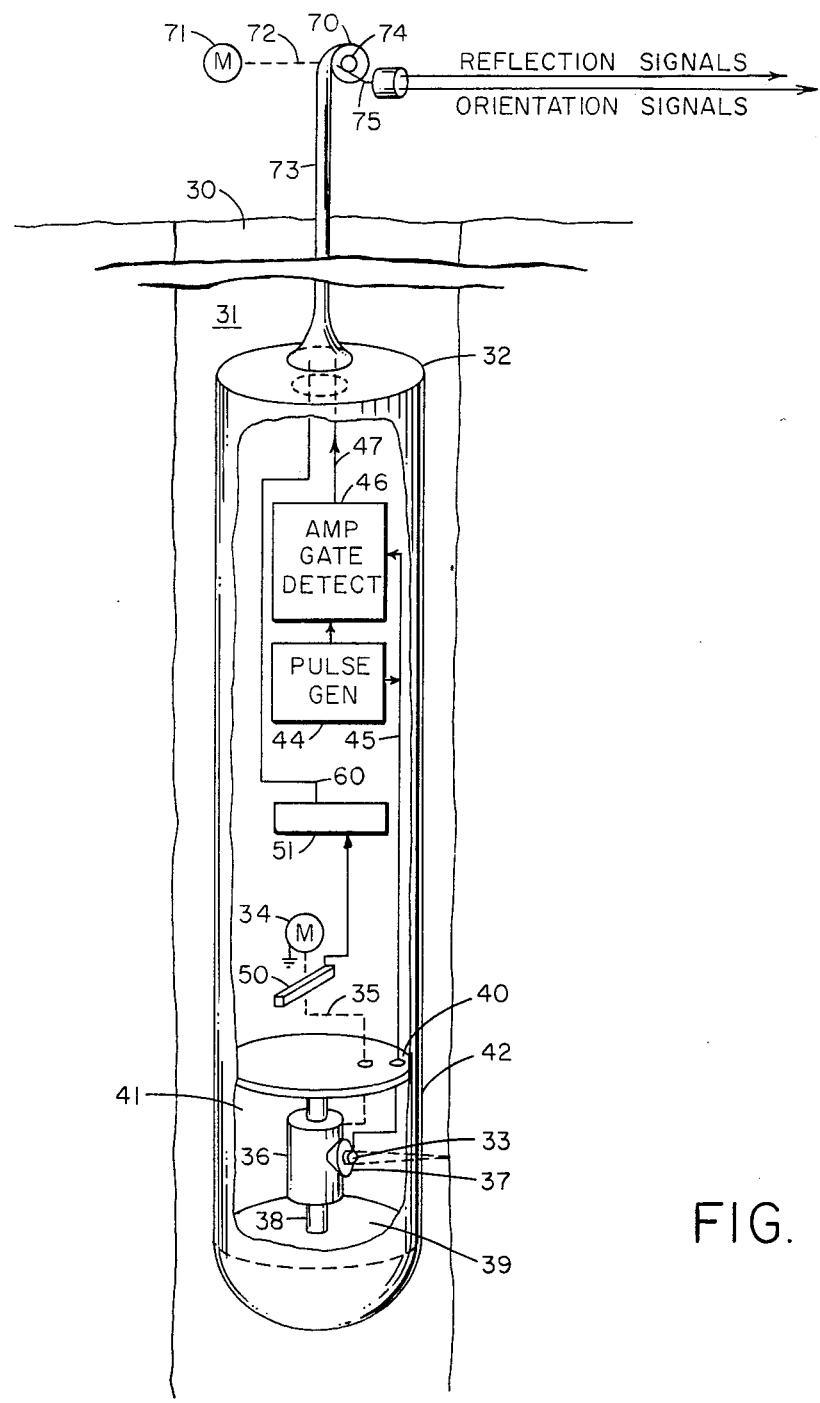
FIG. 1 illustrates a borehole logging tool with which the PPI display system of the present invention may be employed.

Before describing such invention in detail, a brief description of a typical borehole logging tool with which the present invention may be utilized will be made in conjunction with FIG. 1. A borehole 30 containing a borehole fluid 31 is traversed by a borehole logging tool 32. An acoustic transducer 33 is located within tool 32 and acts as a transmitter and receiver of acoustic energy. During logging operations the transducer 33 is rotated through 360° by motor 34, mechanical drive 35 (illustrated in detail in U.S. Pat. No. 3,378,097), sleeve 36, and transducer mount 37. The sleeve 36 rotates about mandrel 38 which connects end member 39 to structure 40. In one embodiment, the transducer is rotated at a rate of about 3 to 6 Hertz. During each 360° cycle, the transducer 33 is pulsed periodically, in one embodiment, at a rate of about 2000 pulses per second for the application of acoustic pulses to the borehole wall by way of tool fluid 41, rubber boot 42, and the borehole fluid 31. The predominant frequency of the acoustic pulses may be of the order of 1.35 megahertz. Pulse generator 44, which is coupled to transducer 33 by way of conductor 45 and slip rings (not shown), periodically actuates the transducer 33 for the production of acoustic pulses. Between transmitted acoustic pulses, reflected energy is detected by the transducer 33 and applied to the surface by way of conductor 45; amplifier, gate and detector system 46; and cable conductor 47.

Coupled to mechanical drive 35 for rotation therewith is a magnetic north sensing means 50 which in turn is coupled to circuitry 51 which produces an orientation signal or pulse each time the transducer 33 passes magnetic north. This orientation pulse is applied to the surface by way of cable conductor 60.

During logging operations, drum 70, driven by motor 71 and connection 72, winds and unwinds the supporting cable 73 to move the tool 32 continuously through the borehole. At the surface, the various orientation pulses and reflection signals are taken from the cable conductors by way of slip rings and brushes illustrated respectively at 74 and 75.

Having described one embodiment of a borehole logging tool with which the present invention may be utilized, the details of such invention, particularly as it relates to the generation of sine and cosine functions from borehole tool orientation pulses for controlling the PPI display, will be described in conjunction with FIGS. 2-4.

As previously noted, the downhole magnetometer senses the earth's magnetic field as the borehole logging tool transducer rotates and an orientation pulse is produced each time magnetic north is sensed. Rotation of the tool relative to magnetic north causes changes in the apparent transducer variation. Temperature and other borehole conditions could cause the rotation speed of the borehole tool to vary, thereby further varying the period of such orientation pulses. The generation of fixed frequency sine and cosine functions directly from the variable time occurrences of such orientation pulses will result in a PPI reference circle that is not circular, but distorted. Further, unsophisticated digital systems will produce displays that are either incomplete or overlapped. This is highly undesirable as such distortions will not be distinguishable from contour changes in the borehole. By means of the present invention a circular PPI reference circle is generated as shown at 80 on the PPI display 81 of FIG. 2 even though the orientation pulses utilized to generate such reference circle are time variable. This is accomplished by the generation of sine and cosine functions whose periods vary in accordance with the time between such variable orientation pulses. In this manner the modulation of electron beam sweeps having the circular reference circle 80 on the PPI display 81 of FIG. 2 by successive video signals occuring at times $t_1$, $t_2$, etc. will produce the desired azimuthal display 82 of the scanning operations of the borehole unperturbed by the effects of the earth's magnetic field or other distortion.

In accordance with the present invention, the desired azimuthal display of the scanning operations of the borehole is provided through the generation of sine and cosine functions whose periods vary in accordance with the time between orientation pulses. More particularly, a digital representation of the period $C_{p1}$ between successive orientation pulses will be used to generate sine and cosine functions for use in generating the PPI reference circle during the period $C_{p2}$ between the next successive orientation pulses. Theoretically, a digital count is started in response to an orientation pulse and is stopped with the next successive orientation pulse. This digital count $C_p$ is, therefore, proportional to the time period between such orientation pulses for 360° of borehole tool rotation. For 180° of rotation, the binary division of count $C_p$ would be $C_p/2$. For 90° of rotation, the binary division of count $C_p$ would be $C_p/4$. This binary division can be continued until $C_p/2^N$ represents a desired degree of resolution for the PPI reference circle. For example, the termination of the sine and cosine functions within one degree of the rotational occurrence of the next orientation pulse would require a binary division of $C_p/2^9$, thereby yielding a resolution of 0.703°. Such resolution of 0.703° has therefore been attained by dividing the sine and cosine function time periods into $2^9$ or 512 discrete intervals. It is such a binary count of $C_{p1}/2^N$, derived for the time period $C_{p1}$, for example, that is used to generate the sine and cosine functions for the next succeeding time period $C_{p2}$.

The circuitry for generating such sine and cosine functions will now be described in conjunction with FIG. 4. A counter 85 is started by the orientation pulse 86 and counts up at a very high rate compared to the periodicity of the orientation pulse rate. For example, a count rate of 2.5 Mhz is suitable for an orientation pulse rate of 1 Hz to 10 Hz. Counting continues until the next succeeding orientation pulse 87 occurs. The total count at this point, $C_p$, is divided in the divider 88 by $2^N$ to provide the desired degree of resolution. This binary count, $C_p/2^N$, is loaded and latched into the storage register 89. This storage register 89 transfers the least significant time interval information to a down counter 90 which decrements its value at the same rate at which counter 85 was clocked. When down counter 90 reaches zero count, the vector generator counter 91 is incremented and down counter 90 is again loaded with the contents of register 89 for the next down count. Each increment of counter 91 is translated by vector generator 92 to the least significant time interval of $360/2^N$ degrees. For example, for a resolution of less than 1°, more particularly 0.703°, 512 successive down counts will cause vector generator 91 to traverse from 0° to 360° in 512 increments of 0.703° each.

Between each pair of orientation pulses, $C_{p1}$ for example, the vector generator 92 will produce sine and cosine values for use in driving the PPI sweep between the next succeeding pair of orientation pulses, $C_{p2}$ for example. Vector generator 92 is a digital-to-sin/cos converter which converts a digital binary input to the trigonometric functions A sine $\theta$ and A cosine $\theta$, where $\theta$ is the digital input angle.

While the vector generator 92 is driving the PPI sweep during time period $CP_2$, for example, with the information determined during time period $CP_1$, the counter 85 is determining the time period of $CP_2$ for use by the vector generator 92 in driving the PPI sweep during the next time period $CP_3$. In this manner, there is no cumulative error and each sine and cosine function starts a PPI sweep within a desired degree of the leading edge of a received orientation pulse.

Figure 5:
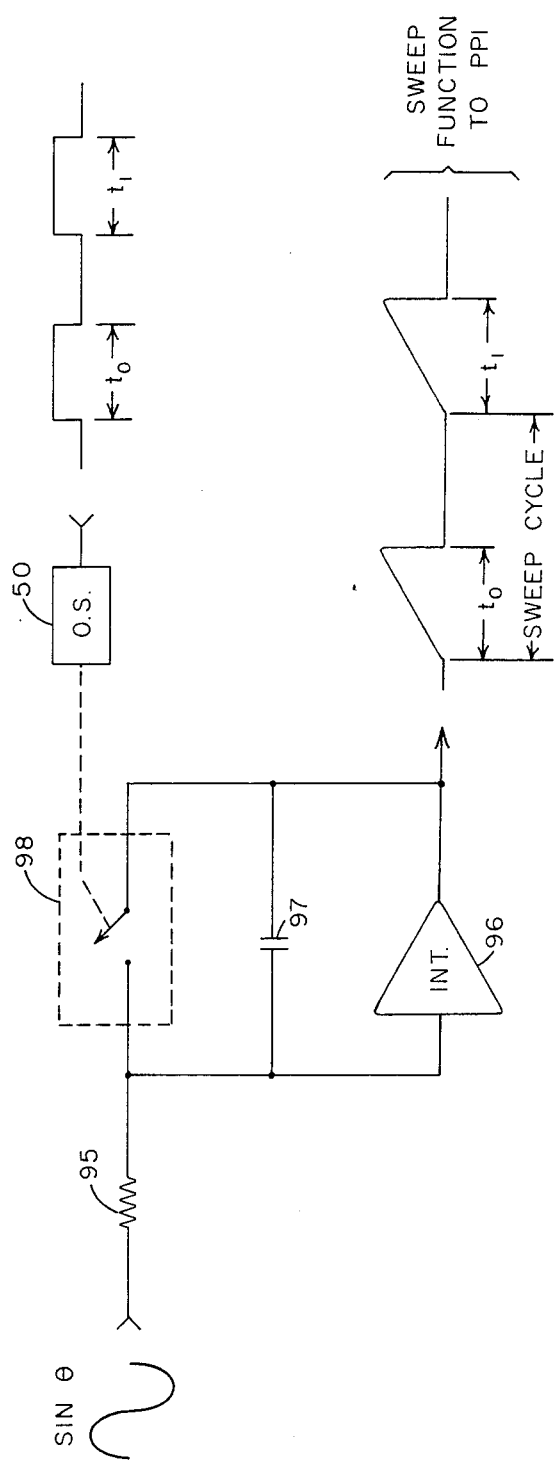
FIG. 5 is an electrical schematic of a portion of the circuitry illustrated in FIG. 4.

The A sine $\theta$ and A cosine $\theta$ functions from vector generator 92 are applied to identical sweep circuits 93 and 94 respectively, one of such sweep circuits, 93 for example, being shown in FIG. 5. The A sine $\theta$ function is applied through input resistor 95 to the integrator 96. Integrator 96 is shunted with the capacitor 97 and electronic switch 98. With switch 98 open, the integrator 96 sweeps or changes to the value of the input A sine θ function as shown in FIG. 6. When switch 98 closes, the sweep valve returns to zero until the electronic switch 98 is again opened to begin the next sweep cycle. Switch 98 is operated by the one-shot multivibrator 50 which is controlled by an input pulse to preferably having a pulse width of about 576 micro seconds and a frequency of about 1.736 kilohertz. The resulting sweep function, as shown in FIG. 5, is applied to the horizontal input of the PPI display 81.

In similar manner, the sweep circuit 94 produces a sweep function for applying to the vertical input of the PPI display 81. These two sweep functions cause the electron beam of the PPI to sweep outward from the center of the PPI display and to return to the center of the PPI display for each sweep cycle so as to produce the successive sweeps $t_o$, $t$, $t_2$, etc. as shown in FIG. 2. Each electron beam sweep is started in coincidence with the actuation of transducer 33 and is then intensity modulated to produce its desired azimuthal display 82 of the scanning operations of the borehole.

Figure 4:
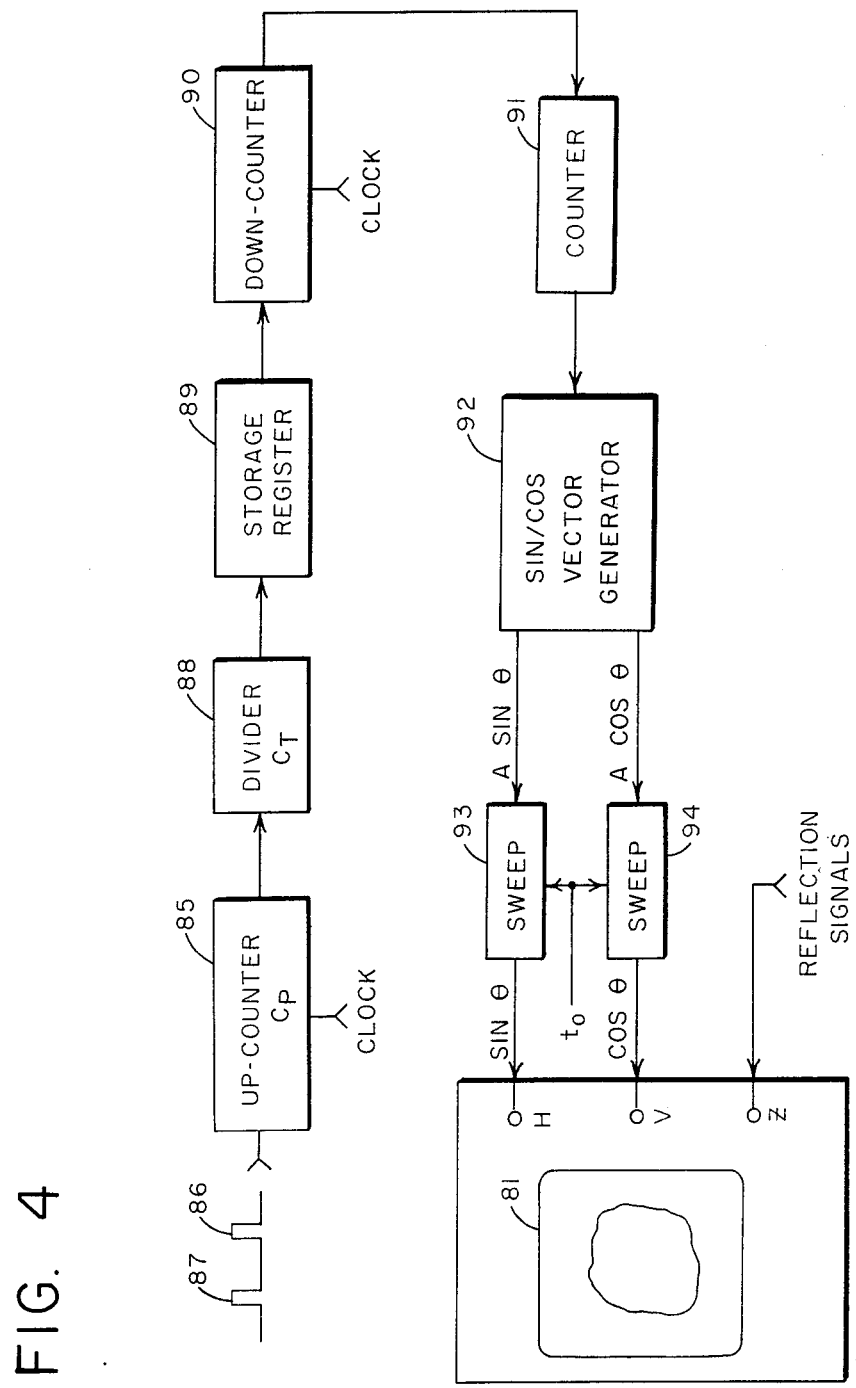
FIG. 4 is a block diagram schematic of circuitry for producing the PPI display in accordance with the timing diagram of FIG. 3.

It is to be understood that the circuitry of FIG. 4 is merely representative of one embodiment of the present invention. In such embodiment, various types and values of circuit components may be utilized. In accordance with the specific embodiment of FIG. 4, the following TABLE sets forth specific types and values of the circuit components.

TABLE

| Reference Designation | Description |
| --- | --- |
| Counter 85 | 74LS161 Synchronous Counter (Texas Instruments) |
| Divider 88 | Division (Binary Shift) implemented in wiring |
| Storage Register 89 | 74LS161 Synchronous Counters (Texas Instruments) |
| Counter 90 | 74LS191 Synchronous Counters (Texas Instruments) |
| Counter 91 | 74LS161 Synchronous Counters (Texas Instruments) |
| Vector Generator 92 | NATEL DTG 5126 Digital Trigonometric (Vector) Generator |
| PPI Display 81 | TEXTRONIX 5403 |
| Integrator 96 | TL084 (Texas Instruments) |
| Capacitor 97 | 0.01 Microfarads |
| Electronic Switch 98 | HI 5041 (Intersil) |
| Multivibrator 58 | CD 4098 (R.C.A.) |

What is claimed is:

1. A method for recording data obtained from azimuthal scanning operations within a borehole, comprising:
   (a) cyclically rotating energy transmitting and receiving means in a borehole,
   (b) operating said transmitting means during each cycle to transmit energy pulses,
   (c) operating said receiving means to detect said energy pulses as they are reflected back to said receiving means,
   (d) producing orienting pulses each time said transmitting and receiving means pass a known geographic orientation,
   (e) measuring the time variable periods between said orienting pulses,
   (f) producing sine and cosine functions in response to each of said orienting pulses, said sine and cosine functions having variable time periods corresponding to said measured time variable periods,
   (g) producing first and second time variable sweep functions corresponding to said time variable sine and cosine functions respectively,
   (h) applying one of said time variable sweep functions to the horizontal deflection means of a PPI display system and the other of said time variable sweep functions to the vertical deflection means of the PPI display system to rotate the sweep of the electron beam of the PPI display system in a reference circle corresponding in time to the time period between the pairs of time variable orientation pulses, whereby a uniform reference circle is continuously generated on the face of the PPI display medium, regardless of variability in the occurrences of said orienting pulses, and
   (i) applying said detected energy pulses to the electron beam modulating means of said PPI display to produce an azimuthal display of said scanning operations.

2. The method of claim 1 further including the steps of:
   (a) dividing said measured time variable periods into a plurality of discrete intervals, and
   (b) producing sine and cosine functions having a plurality of sine and cosine values corresponding to said plurality of discrete intervals.

3. A borehole logging system for producing an azimuthal scan of a borehole comprising:
   (a) an energy transmitter and receiver assembly adapted to be moved through the borehole and rotated about the borehole axis,
   (b) means for generating an orientation pulse each time said assembly passes a known geographical orientation,
   (c) means for measuring the time variable periods between successive orientation pulses,
   (d) means for dividing said measured time variable periods into a plurality of discrete intervals,
   (e) means for producing sine functions and cosine functions in response to each of said orientation pulses and having time periods corresponding to said measured time variable periods, said sine and cosine functions having a plurality of sine and cosine values corresponding in number to said plurality of discrete intervals, and
   (f) means for producing first and second time variable sweep functions having a plurality of sweep cycles corresponding to said plurality of sine and cosine values respetively,
   (g) a PPI display device,
   (h) means for applying said plurality of sweep cycles of said first and second time variable sweep functions to the electron beam deflection means of said PPI display device to produce a circular rotating beam sweep in which each revolution corresponds in time to one of said measured time variable periods, and
   (i) means for applying the output of said energy transmitter and receiver assembly to the electron beam modulation input of said PPI display device so as to produce a visual display of the azimuthal scan of the borehole.

4. The system of claim 3 wherein said means for measuring the time variable periods between successive orientation pulses includes an up-counter which counts up from zero at a known counting rate during said time period.

5. The system of claim 4 wherein the means for dividing said measured time variable periods into a plurality of discrete intervals includes a binary divider which divides the output of said up-counter at the termination of said time period into a digital count representative of the time interval for each of a known number of electron beam sweeps during each 360° of revolution of the circular reference pattern on the PPI display device.

6. The system of claim 5 further including a down-counter which cylically counts down to zero from the value of the digital count output of said binary divider at said known counting rate.

7. The system of claim 6 wherein the means for producing a sine function and a cosine function includes a digital-to-sine/cosine converter which produces values of said sine and cosine functions each time said down-counter reaches a zero digital count, each value of sine and cosine being applied to the electron beam deflection means of said PPI display device.

8. The system of claim 7 further including
(a) a latch to which the digital count output of said binary divider is stored from the termination of said measured time variable period, to the end of the next succeeding measured time variable period,
(b) means for resetting said up-counter for measuring the next succeeding time variable period between orientation pulses while said sine and cosine functions are being generated for the preceding measured time variable period.

9. The system of claim 3 wherein the means for producing said plurality of sweep cycles for said first and second time variable sweep functions includes:
(a) a first integrator to which said sine function is applied, said first integrator providing a first sweep cycle by changing to the value of said sine function over the time period of the outward sweep of the electron beam of the PPI display device, and
(b) a second integrator to which said cosine function is applied, said second integrator providing a second sweep cycle by changing to the value of the cosine function over the time period of the outward sweep of the electron beam of the PPI display device.

10. The method of claim 3 wherein each outward sweep of the electron beam of the PPI display device is started in coincidence with the transmission of energy pulses from said transmitting means.

* * * * *